Dec. 10, 1929. H. E. HULL Re. 17,520

MOTOR VEHICLE CONTROL PEDAL

Original Filed July 2, 1926

INVENTOR.
Harry E. Hull

BY J. S. Newton
ATTORNEYS.

Reissued Dec. 10, 1929 Re. 17,520

UNITED STATES PATENT OFFICE

HARRY E. HULL, OF WASHINGTON, DISTRICT OF COLUMBIA

MOTOR-VEHICLE CONTROL PEDAL

Original No. 1,619,421, dated March 1, 1927, Serial No. 120,166, filed July 2, 1926. Application for reissue filed February 7, 1928. Serial No. 252,650.

This invention relates to improvements in motor vehicle controls, an object thereof being to make such arrangements of the brake lever that the accelerator may be controlled by the brake pedal without requiring the operator to remove his foot from such pedal, thereby making it possible to instantly apply the brake.

Other objects and advantages of the invention will appear in the following specification, reference being had to the accompanying drawing, in which—

Figure 1:
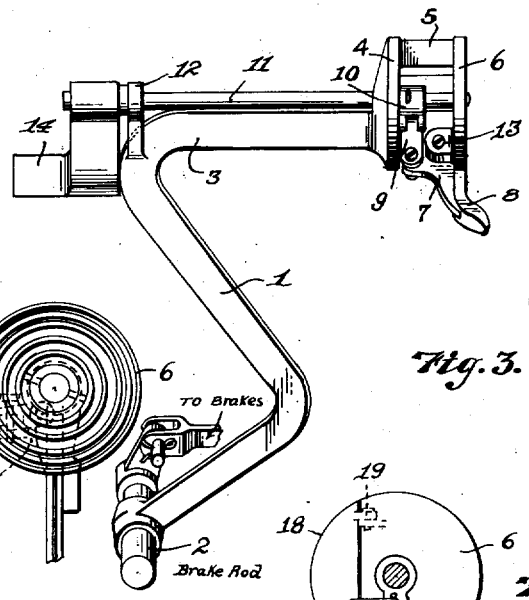
Figure 1 is a perspective view of a brake lever having the accelerator control incorporated therein.
Figure 2:
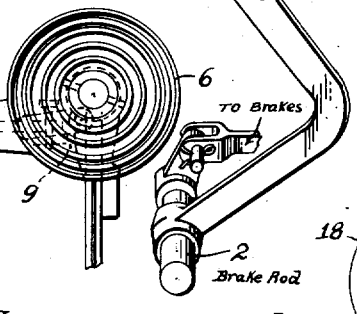
Figure 2 is an elevation of the brake pedal.
Figure 3:
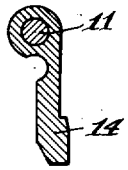
Figure 3 is a detail cross section taken on the line 3—3 of Figure 1.

The familiar arrangement in motor vehicles is that the accelerator pedal is located a short distance to one side of the brake pedal so that the operator may shift his foot from the accelerator pedal to the brake pedal in order to apply the brakes. Instances have come to notice where, due to the excitement of an impending accident, the operator has pressed upon the accelerator pedal instead of the brake pedal and thereby caused the very thing that he sought to avoid. It often requires quick thinking on the part of the operator to shift his foot from the accelerator pedal to the brake pedal in order to apply the brakes in time, and obviously the time factor of shifting the foot from one to the other becomes increasingly important as the speed with which the vehicle is traveling increases.

For example, a greater distance must be allowed for stopping when traveling at 60 miles per hour than is required if the vehicle was traveling at 25 miles per hour. One purpose of the invention, as already indicated, is to make it possible for the operator to have both the accelerator and brake under immediate control. Inasmuch as shifting from one pedal to another is eliminated it follows that the foregoing time element is eliminated also, it being possible for the operator to apply the brakes even while he is operating the accelerator.

Another purpose of the invention is to provide associated mechanisms for controlling the brake and the accelerator, both mechanisms being operable by a duplex pedal comprising main and auxiliary members coupled together to form a common tread for the operator's foot. The main and auxiliary members of the pedal are respectively connected with the brake and accelerator controlling mechanisms. To set the brakes, the operator thrusts his foot against the duplex pedal as in the ordinary breaking operation, but the movement of the duplex pedal as a whole does not affect the accelerator. To effect an actuation of the accelerator an abnormal movement of the operator's foot is required, as by canting the foot to one side to actuate the auxiliary member of the pedal. In this way, when the brakes are applied on an impulse of the moment, the operator would not unintentionally give to his foot the abnormal movement required to operate the accelerator; but the operator, by an abnormal movement of his foot, could, at any time, actuate the accelerator irrespective of the position of the duplex pedal. While an abnormal movement of the foot on the duplex pedal is required to actuate the accelerator, yet but little force is required for the purpose as the accelerator responds to comparatively light pressure as compared to the pressure required for applying the brake. Consequently, actuation of the accelerator need not affect the braking mechanism. All this will be understood by referring to the drawing.

1 designates the brake lever of a motor vehicle, the same numerals being employed to designate the same parts in each of the various modifications disclosed. The brake lever has a hub 2 at the lower extremity, by means of which it is secured upon any ordinary brake rod so that a movement of the lever in one direction will turn the rod and so apply the brakes. The lever in this instance has a straight portion 3 herein known as the stem. This stem terminates in a pedal 4 which in some instances is movable in reference to the stem as appears later.

Bridges 5 (Fig. 1) support the auxiliary pedal 6 in spaced relationship to the main pedal 4, the space between the two pedals being occupied by the short arm 7 of a crank 8, a link 9, an arm 10 and a portion of a rod 11 which is revolubly mounted between the pedals and the bearing 12 upon the stem 3. The crank 8 is pivoted at 13 beneath the auxiliary pedal 6, and the crank extends out to the side of said pedal so that the operator may conveniently tilt his foot in the direction of the crank and cause rotation of the rod 11 in its bearing. This is accomplished by means of the link 9 and the arm 10.

A plate 14, secured to the rod 11 so as to move therewith when the latter is revolved, serves the purpose of actuating that device which has connection with the carburetor or other fuel supply control. The fuel supply control is not shown in the drawing, but by reference to Figure 6 the reader can easily see that the connection 15 of the bell-crank 16 may lead to such control. The rocking of the plate mentioned against the contact screw 17 of that bell-crank produces such motion as will increase the fuel supply to the engine. The plate 14 is movable on the arc of a circle when the brake lever 1 is depressed, but in practice the arrangement is such that the contact screw 17 will never be out of range of the plate 14, and control of the fuel supply may, therefore, be had at all of the positions of the brake lever. The depression of the brake lever does not of itself increase the fuel supply, it being required to press down upon the crank 8 to rock the plate 14 before this may be accomplished. The plate 14 gravitates against the side of the lever 1 and therefore keeps the crank 8 extended in the desired engaging position. But in practice the spring usually employed in connection with the fuel supply control may be made to lend aid in returning the plate 14 against the lever 1 keeping the crank extended.

Figure 5:
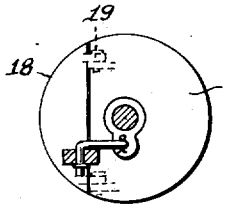
Figure 5 is an elevation of the pedal in Figure 4.
Figure 4:
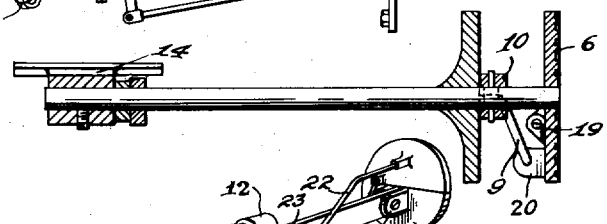
Figure 4 is a plan view of the brake lever employing a modified form of pedal.

Reference is next made to Figures 4 and 5. All parts corresponding with those in the first form of the invention are identified by similar reference characters without repetition of description. The auxiliary pedal 6 is split so that the section 18 may be rocked, for which purpose hinges 19 are provided. The hinged and movable section corresponds with the crank 8 in Figure 1, and the lug 20 on the underside of the hinged section corresponds with the short arm 7 of the crank. All other parts and the actions are equivalent.

Figure 6:
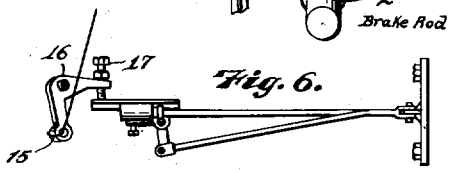
Figure 6 is a plan view of a brake lever wherein the entire pedal is rockably mounted.
Figure 7:
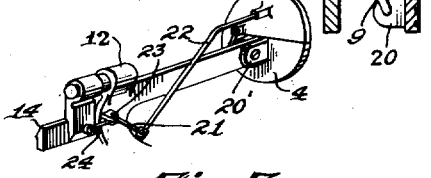
Figure 7 is a detail perspective view of the structure in Figure 6.

Reference is finally made to Figures 6 and 7. Parts corresponding with Figures 1 and 4 are again designated by corresponding numerals. In this instance the auxiliary pedal 6 is omitted, and in lieu of making the main pedal 4 rigid upon the stem 3 of the brake lever 1, it is now hingedly mounted at 20′ so that the entire brake pedal can be rocked in reference to the stem 3 upon occasion. The plate 14 has a sufficiently ample bearing at 12 to provide the necessary support thereof, it being noted that the revoluble rod 11 is omitted.

In order to translate the rocking motion of the main pedal 4 to the plate 14 use is made of a bell-crank 21, and a link 22 connecting the bell-crank with the pedal 4. The bell-crank is pivoted upon the lever 1 as at 23. The short arm of the bell-crank carries a screw 24, the point of which contacts a portion of the plate 14.

The operation may be readily understood. In the ordinary running of the engine, the operator will have his foot against the pedal 6 in Figures 1 and 4 and against the pedal 4 in Figure 7. A lateral pressure in the first two instances will cause turning of the rod 11 and displacement of the plate 14 so that the fuel supply control is operated an amount equal to the pressure. In Figure 7 a rocking motion of the pedal 4 will have the same result. In none of the foregoing instances is the operator supposed to exert such pressure upon the pedal as will move the brake lever 1 forwardly. Should occasion arise for the application of the brakes the operator may exert such pressure upon the pedal as will move the brake lever forwardly.

He is not put to the necessity of shifting his foot from one position to another in order to accomplish the latter purpose. He can press down upon the brake lever while still "feeding gas", but in applying the brakes he can at the same time give his foot such additional rocking motion as will bring the plate 14 back to the original position against the side of the lever 1 thereby to close the throttle valve of the fuel control.

In each of the instances concerned, it is the rocking of a brake pedal, or the equivalent thereof, that produces such movement at the plate 14 as is useful to operate the fuel supply control. It is unnecessary to move the brake lever 1 at all from its original inoperative position in order to obtain the full range of control of the fuel supply. The normal action of the brake lever is not a component of the fuel control pedal action. The action of such pedal or its equivalent is entirely independent of that of the brake lever.

While the construction and arrangement of the improved control pedal is that of a generally preferred form, obviously modifications and changes may be made without departing from the spirit of the invention or the scope of the claims.

I claim:

1. In a motor vehicle having an engine with a fuel supply control, road wheels with brake mechanism therefor driven by the engine, an operating lever for said brake mechanism, said lever including a stem; a revoluble element extending along the stem, a plate carried at one end of said element, a pedal member mounted to be rocked in the general direction of movement of the brake lever, said rocking movement being independent of the braking movement of the lever, and means for translating the rocking movement of said pedal member into turning movement of said element and plate to actuate the fuel supply control.

2. In combination with the fuel supply control and a movable lever of a motor vehicle; a revoluble element having bearing upon a portion of the lever moving with the lever but having independent turning motion, a plate carried by said element moving away from said lever when the element is turned, a pedal member, means upon which said member is mounted to rock independently of said element, and connecting means between said pedal member and said element for translating the rocking movement of said member into turning movement of the element to actuate the fuel supply control at said plate.

3. In combination with the fuel supply control and a lever of a motor vehicle; a rod journaled upon a portion of the lever, a plate carried by the rod, a rockable pedal member, an arm carried by the rod, and a link connecting the arm with the pedal member translating the rocking motions of the latter to turning motions of the rod thereby to actuate the fuel supply control at said plate.

4. In combination with the fuel supply control and a lever of a motor vehicle; a pedal fixed in relationship to the lever, a rockable crank mounted upon the pedal being capable of rocking motion independently of the normal motion of the lever, a rod journaled upon a portion of the lever and having a plate, an arm fixed on the rod, and a link connecting the arm with the crank for translating the rocking motion of the crank into turning motion of the rod to actuate the fuel supply control at said plate.

5. In combination with the fuel supply control and a lever of a motor vehicle, said lever having a main pedal; an auxiliary pedal in fixed and spaced relationship to the main pedal, a crank rockably mounted upon the auxiliary pedal including a short arm situated in the space between the pedals, a rod journaled upon a portion of the lever having a plate at one end and an arm at the other, said arm being situated in the space between the pedals, and a link connecting the arm on the rod with the short arm of the crank for translating rocking movements of the crank to turning movements of the rod for actuating the fuel supply control at said plate.

6. In combination with the fuel supply control and a lever of a motor vehicle, said lever having a pedal, a portion on the side of the pedal and having a pivotal connection therewith, a rod journaled upon a portion of the lever having a plate at one end and an arm at the other, and a link joining the arm with said pedal portion for translating rocking movements of said pedal portion into turning movements of the rod for the purpose described.

7. In combination with the fuel supply control and a lever of a motor vehicle means including; a pedal mounted upon a portion of the lever for either depressing the lever to perform the function of the lever or to operate the fuel supply independently of any movement of the lever, a plate mounted upon the lever, and connecting means between the plate and said first mentioned means including a rod and link for swinging the plate for the purpose described.

8. The combination of a brake operating means and means for operating an accelerator of an automobile comprising a pedal for operating the brake by forward pressure thereon of the driver's foot, means in proximity to said brake pedal and operable independently thereof by a canting of the foot for operating the accelerator, a connection between the means for operating the accelerator and the accelerator, said means having a lost motion connection therein comprising a lever and a swinging plate connected with said brake pedal for allowing operation of the pedal without operating the accelerator but permitting the operation of the accelerator in any position of the pedal without removal of the foot from the pedal.

9. The combination with a brake lever, of a main pedal mounted thereon with the tread of the pedal positioned to receive the usual braking thrust of the foot of the operator, an auxiliary pedal pivoted to the side of the main pedal with the tread of the auxiliary pedal in the same plane as the tread of the main pedal in the normal relation of the two pedals, the auxiliary pedal remaining inoperative during the ordinary braking thrust and said auxiliary pedal being operable by canting of the foot on the main pedal, an actuating means mounted on the brake lever and connected with the auxiliary pedal to be actuated by the movement of the auxiliary pedal relative to the main pedal, and accelerator control means adapted to be operated by said actuating means.

10. The combination with a brake lever, of a main pedal fixed thereon with the tread of the pedal positioned to receive the usual braking thrust of the foot of the operator, an auxiliary pedal pivoted to and projecting from a side of the main pedal with the tread of the auxiliary pedal in the same plane as the tread of the main pedal in the normal relation of the two pedals, the tread of the auxiliary pedal being less extensive than the tread of the main pedal so that the main pedal receives the braking thrust of the operator's foot while the auxiliary pedal remains unaffected by such thrust, said auxiliary pedal being operable by a canting of the operator's foot on the main pedal, an actuating means mounted on the brake lever and connected with the auxiliary pedal to be actuated by the movement of the auxiliary pedal relative to the main pedal, and accelerator control means adapted to be operated by said actuating means.

11. The combination with a brake lever, of a main pedal fixed thereon with the tread of the pedal positioned to receive the direct braking thrust of the operator's foot, of an angular lever pivoted to the main pedal having one arm projecting from the side of the pedal, said arm providing an auxiliary pedal having a tread in the same plane as the tread of the main pedal and the tread of the auxiliary pedal having an area less than that of the main pedal so that the braking thrust of the operator's foot will be imparted to the tread of the main pedal, said auxiliary pedal being operable only by sidewise canting of the foot on the tread of the auxiliary pedal, an actuating means mounted on the brake lever and connected with the other arm of the angular lever to be operated by the movement of the auxiliary pedal relative to the main pedal, and accelerator control means adapted to be operated by said actuating means.

12. The combination of a brake operating means and means for operating an accelerator of an automobile, comprising a pedal for operating the brake by forward pressure thereon of the driver's foot, means carried by said brake pedal connected to the accelerator and having its upper surface movable into and out of the plane of the upper surface of the brake pedal and operable independently thereof by a sidewise canting of the foot for operating the accelerator, without the necessity of removal of the operator's foot from the brake pedal.

13. The combination of a brake operating means, and means for operating an accelerator of an automobile, comprising a pedal for operating the brake by forward pressure thereon of the driver's foot, means connected to the accelerator and pivoted to said brake pedal on a pivot extending parallel to the outer surface of the brake pedal and operable independently thereof by a side-wise canting of the foot for operating the accelerator, the connections allowing operation of the brake pedal without operating the accelerator but permitting the operation of an accelerator by a sidewise canting of the foot in any position of the brake pedal without removal of the foot from the pedal.

14. The combination with a brake lever, of a main pedal fixed thereon with the tread of the pedal positioned to receive the usual braking thrust of the foot of the operator, an auxiliary pedal pivoted to and projecting from a side of the main pedal with the tread of the auxiliary pedal in the same plane as the tread of the main pedal in the normal relation of the two pedals, said auxiliary pedal being operable by a side-wise canting of the operator's foot on the main pedal, an actuating means mounted on the brake lever and connected with the auxiliary pedal to be actuated by the movement of the auxiliary pedal relative to the main pedal, and an accelerator control means adapted to be operated by said actuating means.

15. The combination of brake mechanism for an automobile including a pedal that moves forwardly of the automobile to apply the brakes, and backward for the release thereof, an accelerator and foot-operated means connected with the accelerator including a foot-engaged member pivoted to the brake operating means on a pivot extending forwardly and parallel to the upper surface of the pedal, and situated for engagement and operation by a foot while still in pedal pushing position and moving laterally over said pedal.

16. In a motor vehicle having a motor fuel supply and a brake with means to control them including a brake lever having a foot pedal thereon, a device pivoted to one side of the pedal with its upper surface in substantially the plane of the upper pedal surface, means connecting said device with the motive fuel control said connecting means including a lever having a contact and a plate movable along over said contact when the brake pedal is depressed and operable by said device to control the fluid flow.

17. The combination of brake mechanism for an automobile including a pedal movable forwardly and downwardly of the automobile for braking, said pedal having a foot engaging surface that lies in a plane to receive forward thrusts from the ball portion of the foot and an accelerator operating mechanism including a foot engageable and movable part on the side of the pedal engageable by the operator's foot when moved sidewise in the plane of the foot engaging surface said foot engaging part being inclined whereby a transverse movement of the foot will cam said foot engaging part downwardly and actuate the accelerator.

In testimony whereof I have hereunto affixed my signature.

Washington, D. C., December 16, 1927.

HARRY E. HULL.